United States Patent
Dawes et al.

(10) Patent No.: US 7,910,082 B2
(45) Date of Patent: Mar. 22, 2011

(54) SYNTHESIS OF ORDERED MESOPOROUS CARBON-SILICON NANOCOMPOSITES

(75) Inventors: Steven Bruce Dawes, Corning, NY (US); Wageesha Senaratne, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 451 days.

(21) Appl. No.: 12/190,867

(22) Filed: Aug. 13, 2008

(65) Prior Publication Data

US 2010/0040834 A1  Feb. 18, 2010

(51) Int. Cl.
*C01B 31/36* (2006.01)
*C01B 31/30* (2006.01)
*B01J 27/224* (2006.01)
*C04B 35/52* (2006.01)
*C04B 35/56* (2006.01)
*C04B 33/32* (2006.01)
*C04B 33/36* (2006.01)
*C04B 35/64* (2006.01)
*B28B 1/00* (2006.01)
*B28B 3/00* (2006.01)
*B28B 5/00* (2006.01)

(52) U.S. Cl. ........ 423/346; 423/345; 423/439; 502/178; 501/88; 264/624; 264/625; 264/628; 264/682; 977/882; 977/883

(58) Field of Classification Search ................. 423/346, 423/439; 502/178; 501/88; 977/882, 883; 264/624, 625, 628, 682
See application file for complete search history.

(56) References Cited

U.S. PATENT DOCUMENTS

| 6,001,756 | A  * | 12/1999 | Takahashi et al. .............. 501/90 |
| 7,056,849 | B2 * | 6/2006 | Wan et al. ......................... 501/87 |
| 7,087,656 | B2 * | 8/2006 | Garcia et al. ..................... 521/63 |
| 7,419,772 | B2 * | 9/2008 | Watkins et al. ................ 430/325 |
| 7,648,932 | B2 * | 1/2010 | Weisensel et al. .............. 501/88 |
| 7,807,267 | B2 * | 10/2010 | Kohmura et al. ............. 428/447 |
| 2005/0084717 | A1 * | 4/2005 | Tani et al. ..................... 428/698 |
| 2006/0110308 | A1 | 5/2006 | Gupta et al. |
| 2007/0042268 | A1 * | 2/2007 | Pak et al. ...................... 429/213 |
| 2008/0152577 | A1 | 6/2008 | Addiego et al. .............. 423/460 |
| 2008/0220244 | A1 * | 9/2008 | Wai et al. ..................... 428/328 |
| 2008/0317953 | A1 * | 12/2008 | Watkins et al. ............... 427/244 |

FOREIGN PATENT DOCUMENTS

| CN | 1401564 | * | 3/2003 |
| JP | 09-048605 | * | 2/1997 |
| JP | 2007261882 |   | 10/2007 |
| WO | 9937705 |   | 7/1999 |
| WO | 2010/019229 | * | 2/2010 |

OTHER PUBLICATIONS

"Morphology-Controlled Synthesis of Nanostructured Silicon Carbide," Xiang-Yun Guo et al. Materials Research Society, vol. 815 (2004), pp. J5.3.1 to J5.3.6.*

(Continued)

*Primary Examiner* — Patricia L Hailey
(74) *Attorney, Agent, or Firm* — Michael W. Russell

(57) ABSTRACT

A method for preparing ordered mesoporous silicon carbide (OMSiC) nanocomposites uses an evaporation-induced self-assembly of a precursor composition that preferably includes a phenolic resin, pre-hydrolyzed tetraethyl orthosilicate, a surfactant, and butanol. The precursor mixture is dried, cross-linked and heated to form ordered mesoporous silicon carbide material having discrete domains of ordered, mesoscale pores.

13 Claims, 8 Drawing Sheets

OTHER PUBLICATIONS

"Preparation of Ordered Mesoporous SiC from Perceramic Polymer Templated by Nanoporous Silica," Jia Yan et al. J. Phys. Chem. B (2006), 110, pp. 5429-5433.*

"Ordered Mesoporous silicon carbide (OM-SiC) via polymer precursor nanocasting," Piotr Krawiec et al. The Royal Society of Chemistry 2006 (Chem. Commun.,), pp. 2469-2470.*

"Periodic mesoporous organosilica mesophates are versatile precursors for the direct preparation of mesoporous silica/carbon composites, carbon and silicon carbide materials," Zhuxian Yang et al. J. Mater. Chem., 2006, 16, pp. 3417-3425.*

"Highly Ordered Mesoporous Silicon Carbide Ceramics with Large Surface Areas and High Stability," Yifeng Shi et al. Advanced Functional Materials, 2006, 16, pp. 561-567.*

"Direct Preparation of High Surface Area Mesoporous SiC-based Ceramic by Pyrolysis of a Self-Assembled Polycarbosilane-block-Polystyrene Diblock Copolymer," Quoc Dat Nghiem et al. Chem. Mater. 2008, 20, pp. 3735-3739.*

"Synthesis and characterization of mesoporous silicon carbide," Guo-Qiang Jin et al. Microporous and Mesoporous Materials 60 (2003), pp. 207-212.*

Raman et al.; "Synthesis of silicon carbide nanorods from mixture of polymer and sol-gel silica"; J Mater Sci (2007) 42: 5891-5895.

Vix-Guterl et al.; "Effect of the properties of a carbon substrate on its reaction with silica for silicon carbide formation"; Carbon vol. 35, No. 10-11, pp. 1587-1592, 1997.

Shi et al.; "Highly ordered mesoporous silicon carbide ceramics with large surface area and high stability"; Adv. Funct. Mater. 2006, 561-567.

Krawiec et al.,; "Ordered mesoporous silicon carbide (OM-SiC) via polymer precursor nanocasting"; The Royal Society Of Chemistry, 2006, 2469-2470.

Shi et al.; "Ordered mesoporous SiOC and SiCN ceramics from atmosphere-assisted in situ transformation"; Chem. Mater. 2007, 19, 1761-1771.

Yao et al.; "Rode of pores in the carbothermal reduction of carbon-silica nanocomposites into silicon carbide nanostructures"; J. Phys. Chem. C 2007, 111, 636-641.

Vix-Guterl et al.; "SiC material produced by carbothermal reduction of a freeze gel silica-carbon artefact"; Journal of the European Ceramic Society 19 (1999), 427-432.

Yan et al.; "Preparation of ordered mesoporous SiCN ceramics with large surface area and high thermal stability"; Microporous and Mesoporous Materials 100 (2007) 128-133.

Besson et al.; "Highly ordered orthorhombic mesoporous silica films"; Microporous and Mesoporous Materials 60 (2003) 43-49.

Schwetz; "Handbook of ceramic hard materials"; ed. R. Riedel, Wiley-VCH, Weinheim, 2000, vol. 1, pp. 683-748.

Lu et al.; "High surface area mesoporous SiC synthesized via nanocasting and carbothermal reduction process"; Journal of Materials Science (2005).

Krawiec et al.; "SiC/MCM-48 and SiC/SBA-15 nanocomposite materials"; Chem. Mater. 2004, 16, 2869-2880.

Park et al.; "A facile route to prepare high surface area mesoporous SiC from SiO2 sphere templates"; J. Mater. Chem., 2004, 14, 3436-3439.

Feng et al.; "Control of pore sizes in mesoporous silica templated by liquid crystals in block copolymer-cosurfactant-water systems"; Langmuir 2000, 16, 5304-5310.

Piotr Krawiec, et al "Tubular and Rodlike Ordered Mesoporous Silicon (Oxy)carbide Ceramics and their Structural Transformation," chem.. Mater. 2008, 20, 5421-5433.

* cited by examiner a)

b)

c)

SYNTHESIS OF ORDERED MESOPOROUS CARBON-SILICON NANOCOMPOSITES

BACKGROUND AND SUMMARY

The invention relates to a method of forming ordered mesoporous silicon carbide nanocomposite materials. The ordered mesoporous silicon carbide nanocomposites are made using an aqueous precursor composition that comprises at least one surfactant, an oil, a carbon precursor, and a silica precursor. The inventive method affords control over the inorganic phases during synthesis, as well as the mesoporous structure, size, surface area and macroscale morphology of the resulting nanocomposite materials.

Non-oxide ceramics have been the subject of investigatory research because they possess an advantageous array of electrical, mechanical and other functional properties. Silicon carbide (SiC), for example, is a semiconducting material with high temperature mechanical stability, high hardness, and excellent heat conductivity. Due to its chemical inertness and ability to tolerate harsh environments, it has been considered for use as a catalyst support. However, commercially available silicon carbide has a low specific surface area, which makes it unsuitable for catalytic applications. As a result, new methods are being developed for preparing high surface area silicon carbide.

One technique for preparing high surface area silicon carbide involves the infiltration of high surface area silica with a SiC precursor followed by the removal of the silica template by etching with HF. Examples of this method involve the chemical vapor or liquid infiltration of the silicon carbide precursor, or the infiltration of nano-sized silica spheres into the template. Such methods can be used to form a high surface area silicon carbide having a disordered structure.

An additional technique for preparing high surface area silicon carbide involves the infiltration of a silica precursor into a porous carbon substrate. By tailoring the $C/SiO_2$ molar ratio, porous, disordered, crystalline SiC nanoparticles and nanofibers can be formed.

In view of the foregoing, there is an interest in preparing ordered, porous silicon carbide materials comprising an open (high surface area) framework. In addition to catalysis, such materials can be used in fuel cells and solar cells, and in applications comprising adsorption and/or separation chemistry. Because versatility in both structure and form of these materials is highly desirable, it would be advantageous to provide an improved, economical synthesis with enhanced processing capability.

In accordance with the present invention, Applicants have unexpectedly determined that ordered mesoporous silicon carbide materials can be prepared by forming an aqueous precursor mixture comprising carbon and silicon precursors, a non-ionic surfactant, and an oil (e.g., water-immiscible liquid), drying and cross-linking the precursor mixture to form an intermediate product, and heating the cross-linked intermediate. The heating process drives three reactions: 1) carbonization of the carbon precursor, 2) condensation of the silica precursor, and 3) carbothermal reduction of the precursors to form silicon carbide.

After preparing the precursor mixture, but before cross-linking of the carbon and silicon precursors, the surfactant self-assembles to form a template for the precursors, which defines a mesoscale liquid crystal phase that, upon heating and removal of the surfactant, forms a silicon carbide composite material that comprises ordered domains of mesoscale porosity.

Ordered mesoporous silicon carbide nanocomposite materials comprise a three-dimensionally ordered and interconnected array of pores that range in size from about 2 to 50 nm. These materials may exhibit BET specific surface areas as high as about 2200 $m^2/g$, and typically exhibit excellent thermal stability in inert atmospheres, and strong resistance to attack by acids and bases.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Figure 1A:
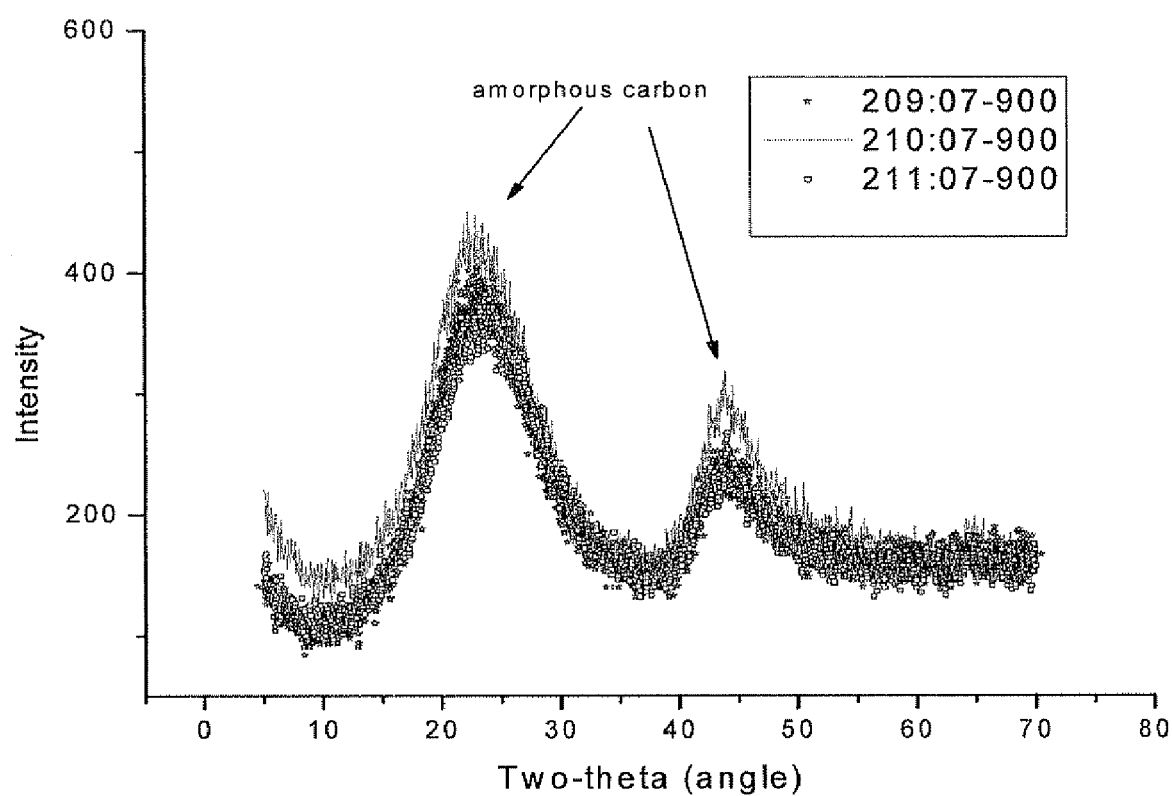
FIG. 1 shows wide angle XRD patterns of ordered mesoporous SiC samples after heating at (a) 900° C. or (b) 1600° C.

The invention relates generally to a method for forming ordered mesoporous silicon-carbon nanocomposites by evaporation-induced self-assembly. A preferred method involves thermal treatment of formulations comprising a phenolic resin as the carbon precursor, pre-hydrolyzed tetraethyl orthosilicate (TEOS) as the inorganic (silicon) precursor, a tri-block co-polymer as the surfactant, and butanol as an oil phase.

According to the inventive method, nanocomposites having an ordered pore structure are obtained, where the carbon/silicon content in the formulation can be varied by adjusting mass ratios of phenolic resin/tetraethyl orthosilicate.

Thermal treatment of the nanocomposites under nitrogen (or argon) yields mostly amorphous carbon and $SiO_2$ at 900° C., but at processing temperatures in excess of 1300° C., an ordered mesoporous silicon carbide (OMSiC) comprising polycrystalline β-silicon carbide and a small quantity of amorphous carbon are formed. Thermal treatment at 1600° C. yields polycrystalline β-silicon carbide with the lowest amount of residual carbon. Advantageously, the pore structure does not change during the conversion of $SiO_2$ to SiC (from 900° C. to 1600° C.) as evidenced by constant mesoscopic d-spacings and an unchanged normalized mass.

As used herein, carbonization refers to the conversion of an organic substance into carbon or a carbon-containing residue through pyrolysis. Carbothermal reduction refers to the reduction of a substance via reaction with carbon at elevated temperatures.

According to the inventive method, the resulting OMSiC replicates the original mesoporous $C/SiO_2$ structure, which enables a wide range of OMSiC structures. The residual carbon can be removed by calcination in air, yielding whitish-grey crystalline β-silicon carbide with an ordered pore arrangement.

These and other aspects and advantages of the invention compared to conventional nanocomposite synthesis processes are summarized below:

- The inventive method obviates the use of inorganic templates, which can reduce the number of preparation steps and the cost involved in producing these materials. By eliminating the need for an inorganic template, the method does not rely on strong bases and/or HF etching.
- Carbothermal reduction over the temperature range 900° C.-1600° C. shows constant mesoscopic d-spacings and unchanged mass (normalized to surface area and pore volume). This supports a conclusion that the resulting OMSiC replicates the original mesoporous $C/SiO_2$ structure. Such replication enables a wide range of OMSiC structures with excellent process flexibility and control over structural evolution.
- The thermal stability of the mesoporosity through the carbothermal reduction contrasts with studies of mesoporous refractory metal oxides where crystalline phase transitions (e.g., anatase to rutile in titania), or simple grain growth cause damage to the mesoporous structure.
- Polycrystalline β-silicon carbide with a hexagonally ordered pore structure can be obtained over a process temperature range of about 1200-1600° C. by heating the precursor mixture in argon.
- Polycrystalline β-silicon carbide and crystalline $Si_xN_y$ (50%) with a hexagonally ordered pore structure can be obtained over a process temperature range of about 1300-1600° C. by heating the precursor mixture in $N_2$.
- High surface area (600-800 $m^2/g$) ordered mesoporous silicon carbide materials can be prepared by heating the precursor mixture to a temperature of about 1600° C.
- Residual carbon can be removed by calcination in oxygen (e.g., air) yielding a whitish-grey crystalline β-silicon carbide, while retaining the ordered pore structure and high surface area.

The silicon carbide mesopore structures can be controlled by experimental and process variables such as the composition of the precursor mixture, choice of solvents, humidity, cross-linking conditions, carbonization, carbothermal and post-carbonization conditions.

Other aspects and advantages of the invention are disclosed below:

Materials

In OMSiC nanocomposite materials, a hexagonally-ordered pore structure can be formed using several different starting formulations wherein the carbon/silicon content is varied by adjusting mass ratios of phenolic resin/tetraethyl orthosilicate (TEOS).

The precursor mixture used in the inventive process includes, for example, a carbon precursor, an inorganic (Si) precursor, a surfactant, and an oil. A preferred carbon precursor is 510D50 phenolic resin (Georgia Pacific), which comprises two different molecular weight species (GPC data, $M_n$~2800 and ~1060). Additional suitable water-soluble carbon precursors include other phenolic resins, thermosetting carbohydrates, polyvinylalcohols, resorcinol-formaldehyde, peptide amphiphiles, lipids, and other biologically-occurring materials. Preferred silicon precursors include TEOS and other polycarbosilanes.

Useful surfactants are PEOy-PPOx-PEOy tri-block co-polymers available from BASF, Inc. In particular, Pluronic™ F127 (x=106, y=70) was used in conjunction with the disclosed inventive method. Additional non-ionic surfactants include Pluronic™ P123 (x=20, y=70), Pluronic™ F103 (x=17, y=60), Pluronic™ F108 (x=127, y=50), Pluronic™ F88 (x=104, y=39) and Pluronic™ F65 (x=19, y=29). A precursor mixture may include one or more surfactants.

The surfactant functions as a temporary, removable organic template for the carbon and silicon precursors. The amount of water and oil additives that are incorporated into the precursor mixture can be used to manipulate the self-assemblage of the surfactant through its liquid crystal phases and, in turn, the structure and properties of the resulting silicon carbide material. Specifically, the chemistry of the precursor mixture can be used to control, for example, the pore diameter and pore volume.

In precursor mixtures comprising a PEOy-PPOx-PEOy tri-block co-polymer, the oil acts as a swelling agent for the PPO block. The addition of an oil phase changes the aqueous mixture from a two phase system to a three phase system. The oil phase also expands the range of the water, surfactant and precursor compositions within which a particular mesostructure is stable. The concentration of oil in the precursor mixture can be used to control the swelling of the hydrophobic part of the micelle structure, and can also control the pore size and pore mesostructure of the resulting ordered mesoporous silicon carbide.

An example of an oil is butanol. However, in lieu of or in addition to butanol, other suitable oils include p-xylene, octane, hexadecane, hexanol, pentanol, butyl acetate, mesitylene and 1,3,5-trimethylbenzene.

Water may be indirectly added to the precursor mixture as a diluent for the acid that is used to initiate hydrolysis or as a product of the hydrolysis reaction.

In precursor mixtures comprising PEOy-PPOx-PEOy tri-block co-polymers, water, if present, interacts with the PEO blocks and, by swelling the phase containing the carbon and/or silicon precursor, can affect the self-assembly of the surfactant template. The concentration of water in the precursor mixture can be used to control the assemblage of mesoporous channels in both the cross-linked material and in the post-thermally treated product.

Synthesis

A silicon carbon nanocomposite material according to one embodiment can be made using the following method. Formulation 210 was made by first adding 3.7 g of F127 to absolute ethanol (~9 ml) and stirring with heat until the surfactant was at least partially dissolved. Next, 3 ml of phenolic resin was slowly added followed by vigorous stirring. Then, 1.5 ml of butanol was added to the mixture followed by continued stirring.

In a separate vial, 1.9 ml of TEOS was mixed with anhydrous ethanol (~1 ml) and 0.1 ml of 1.57 N HCl. The TEOS solution was aged for 20 min to hydrolyze the TEOS, and the two solutions were then mixed together. The combined mixture was stirred at room temperature for 20-30 min, and then poured into crucibles for drying at room temperature for at least 12 hr followed by cross-linking at 150° C. in a 24 hr process.

Carbonization and carbothermal reduction were carried out in alumina crucibles in a high-temperature tube furnace (Deltech Inc, Denver, Colo.) with a multi-step temperature program. An example of a temperature program comprises (1) heating from room temperature to 400° C. at a rate of about 2° C./min, (2) holding at 400° C. for 3 hr, (3) heating from 400° C. to the carbonization (or carbothermal reduction) temperature at about 1° C./min, (4) hold at the elevated temperature for 3-12 hr, and (5) cooling to room temperature. If the samples contained residual carbon, they were further heated in air or a controlled atmosphere at 650° C. to oxidize the residual carbon material. Each formulation was typically thermally treated at a temperature of 900, 1300, 1450 or 1600° C. under flowing $N_2$. As noted above, thermal treatment using $N_2$ (as opposed to Ar) may result in the formation of silicon nitride.

The ordered mesoporous carbon/$SiO_2$ composites form SiC by carbothermal reduction of the silica component. The reduction initiates at about 1300° C., exhibits increasing in crystallinity at about 1450° C., and forms well-ordered β-SiC at about 1600° C. Depending on the reaction conditions, the α-SiC polymorph may be formed as well.

Advantageously, the pore structure does not change during the conversion of ordered mesoporous carbon (OMC)/$SiO_2$ to SiC, as evidenced by constant mesoscopic d-spacings, and an unchanged normalized mass of each sample. Thus, the resulting OMSiC retains the original mesoporous C/$SiO_2$ structure. Any residual carbon can be removed by additionally treating the as-formed OMSiC material to form pure SiC that also retains the ordered mesoporous microstructure.

Effect of Carbon/Silica Ratio

The formulations prepared as above were initially thermally treated at 900 or 1600° C. and analyzed for carbon and silica content. Table 1 shows the initial compositions, which were based on Pluronic® F127, phenolic resin, prehydrolyzed TEOS, and butanol. The post-thermal treatment C/$SiO_2$ molar ratio was calculated from elemental analysis data. It is seen from the C/$SiO_2$ values listed in Table 1 that the carbon to silica ratio is >3, i.e., between about 6 and 20.

TABLE 1

Si—C formulations and post-thermal treatment elemental analysis.

| | precursor mixture | | | | | | chemical analysis | | | | | |
|---|---|---|---|---|---|---|---|---|---|---|---|---|
| formulation | F127 | resin | butanol | TEOS | acid | treatment [° C.] | C | Si | $SiO_2$ | O | other | C/$SiO_2$ |
| 209 | 29% | 29% | 10% | 28% | 5% | 900 | 62.34 | 14.16 | 30.40 | 13.6 | 9.90 | 10.3 |
| | | | | | | 1600 | 63.93 | 23.39 | 50.20 | 1.13 | 11.55 | 6.4 |
| 210 | 35% | 34% | 12% | 18% | 1% | 900 | 75.96 | 9.22 | 19.80 | 11.4 | 3.42 | 19.2 |
| | | | | | | 1600 | 76.36 | 13.98 | 30.00 | 0.79 | 8.87 | 12.7 |
| 211 | 32% | 31% | 11% | 23% | 3% | 900 | 61.96 | 13.14 | 28.20 | 14.4 | 10.50 | 11.0 |
| | | | | | | 1600 | 67.85 | 20.55 | 44.10 | 0.886 | 10.72 | 7.7 |

With a carbon/silica ratio greater than 3, according to the reaction

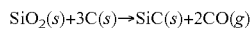
$SiO_2(s)+3C(s)\rightarrow SiC(s)+2CO(g)$ the carbon content is sufficient for the carbothermal reduction of silica for these compositions.

The loss of CO from a stoichiometric C/$SiO_2$ mixture during carbothermal reduction could lead to ~59% mass loss with the Si content increasing from 30 to 70%. In the carbon rich samples listed in Table 1, increasing the treatment temperature to 1600° C. enriched the Si content by about 60-65%. Assuming that no silicon is lost on heating (due to SiO(g) formation), this indicates that the composite mass is reduced by 35-40% during the high temperature treatment.

X-Ray Diffraction

Figure 1B:
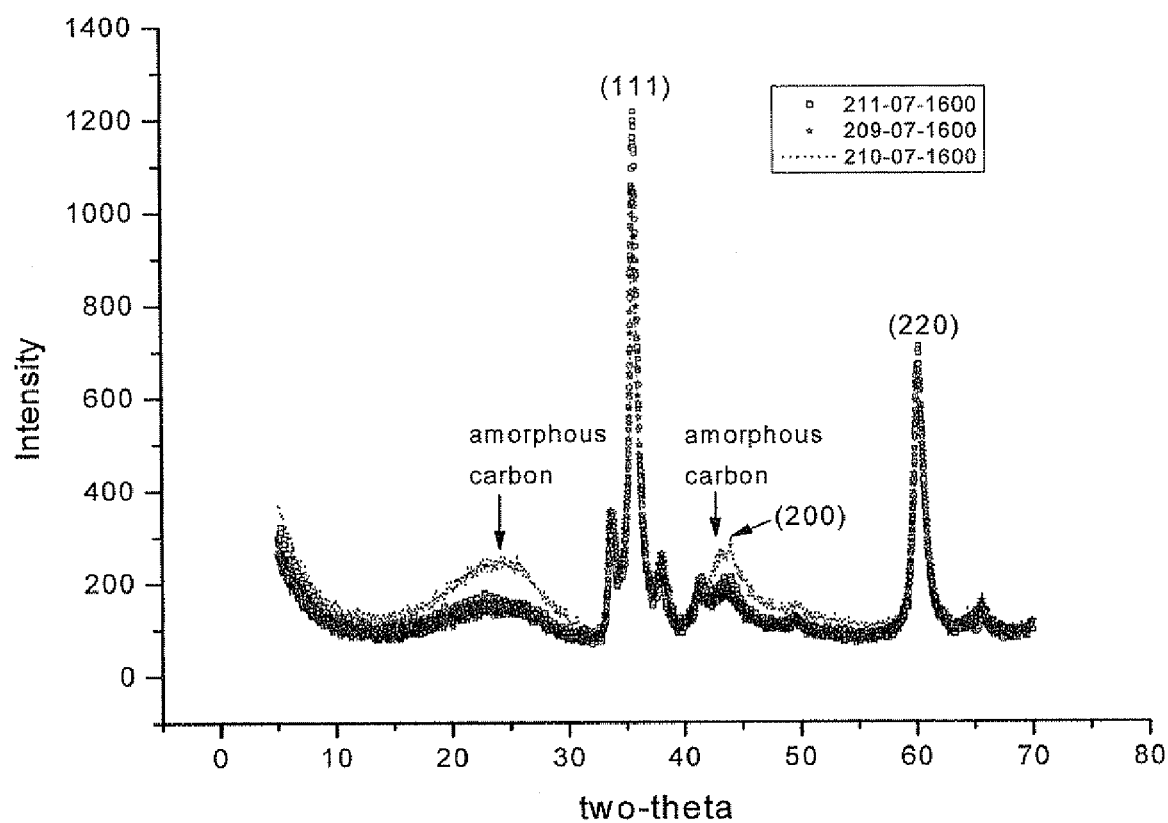

FIG. 1 shows wide angle XRD reflections for OMSiC formulations 209-211, which were heated for 3 hours at (a) 900 or (b) 1600° C. Following a treatment temperature of 900° C. (FIG. 1(a)), no obvious SiC diffraction peaks are observed, but there are clear indications for the existence of amorphous carbon. In contrast, crystalline SiC is detected when the materials are heated to 1600° C. (FIG. 1(b)). Three diffraction peaks at two-theta values of 35.6°, 41.4° and 59.9° are clearly observable, which can be indexed to the (111), (200) and (220) planes of β-SiC. Residual amorphous carbon phase is also detected for these three formulations after the 1600° C. treatment.

Figure 2A:
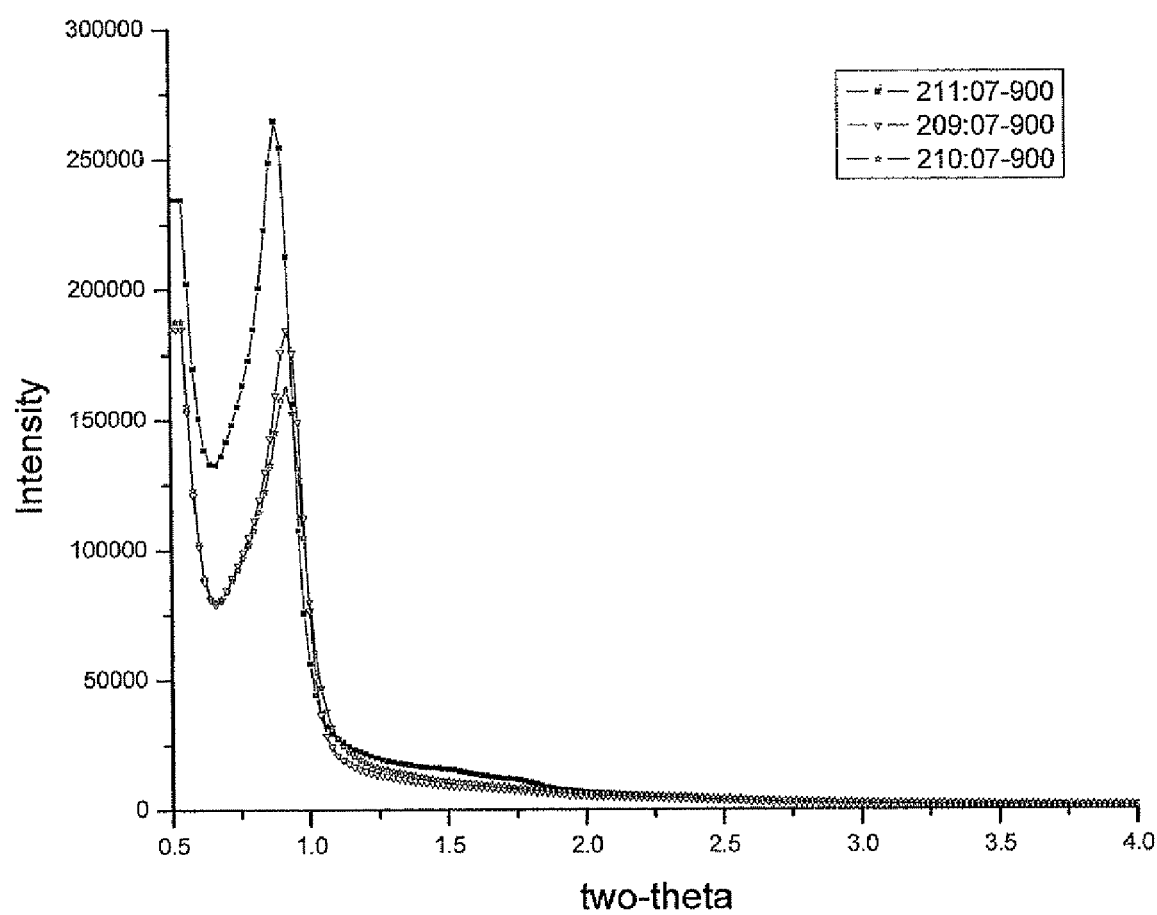
FIG. 2 shows low angle XRD patterns of ordered mesoporous SiC samples after heating at (a) 900° C. or (b) 1600° C.
Figure 2B:
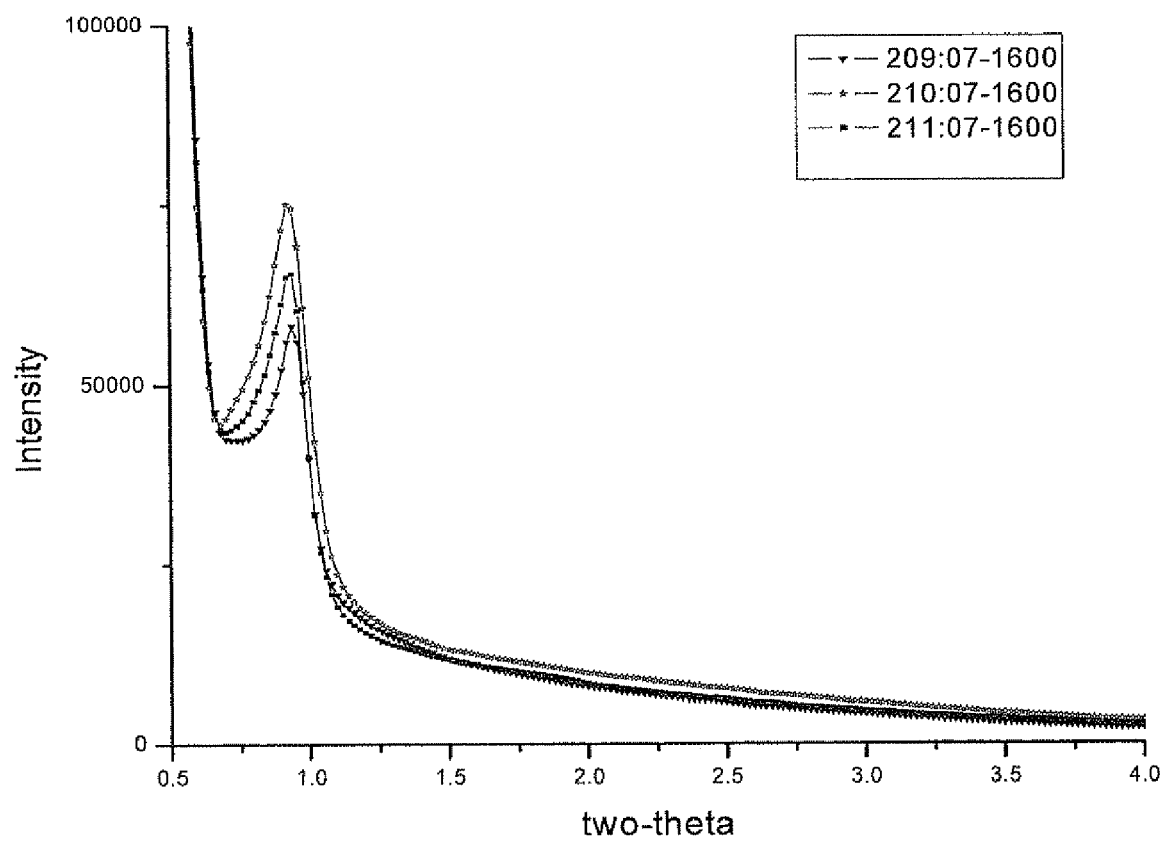

FIG. 2 shows the corresponding low angle powder XRD patterns of the OMSiC samples shown in FIG. 1. The data indicate that the pore structure of the samples is ordered on the mesoscopic scale with an intense low angle peak at a d-spacing of 93-100 nm. For each respective formulation, the position of the (100) peak in low angle XRD remained the same for samples treated at 900° C. or 1600° C. This demonstrates an extraordinary thermal durability of the mesopore structure throughout the thermal treatment of the carbon and silica precursors.

Figure 3A:
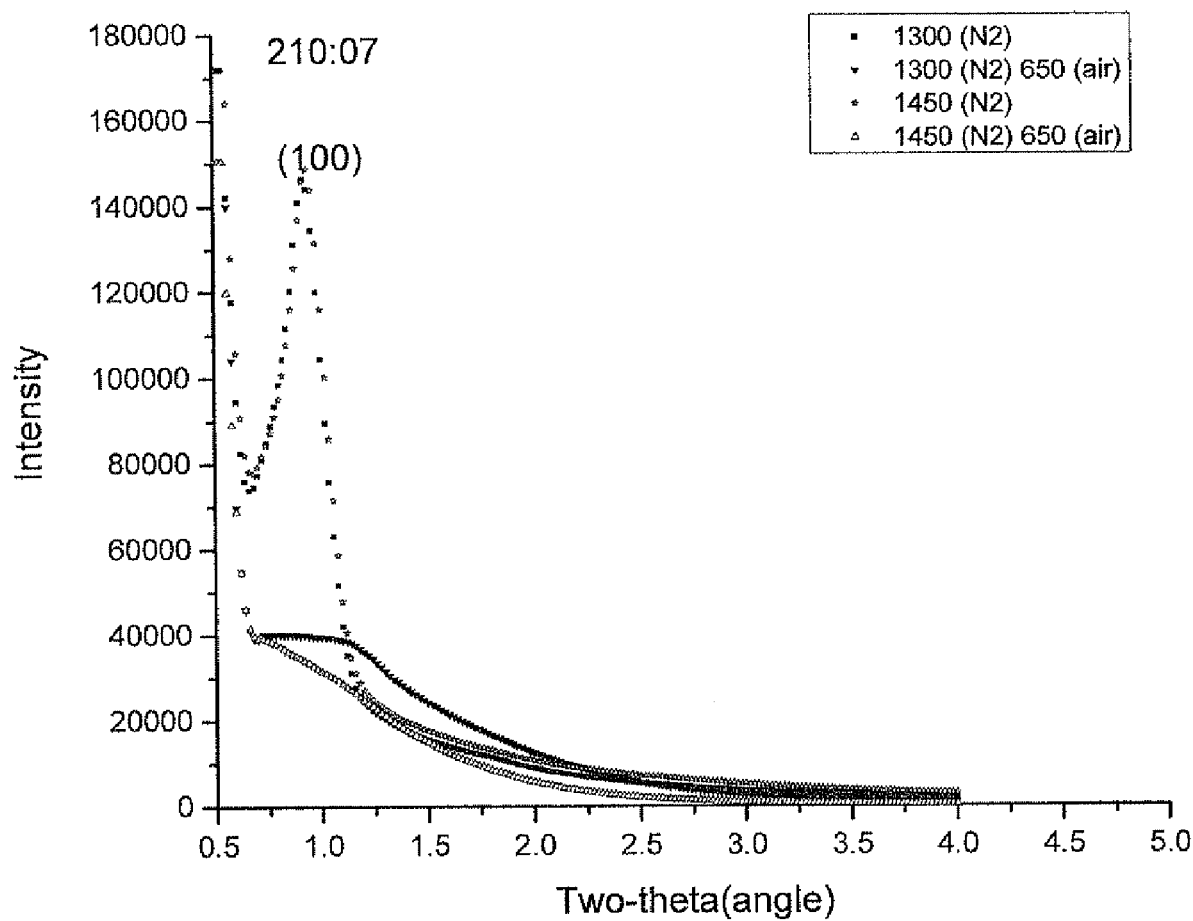
FIG. 3 shows (a) low and (b) wide angle XRD reflections for ordered mesoporous SiC samples after heating at 1300° C. or 1450° C.
Figure 3B:
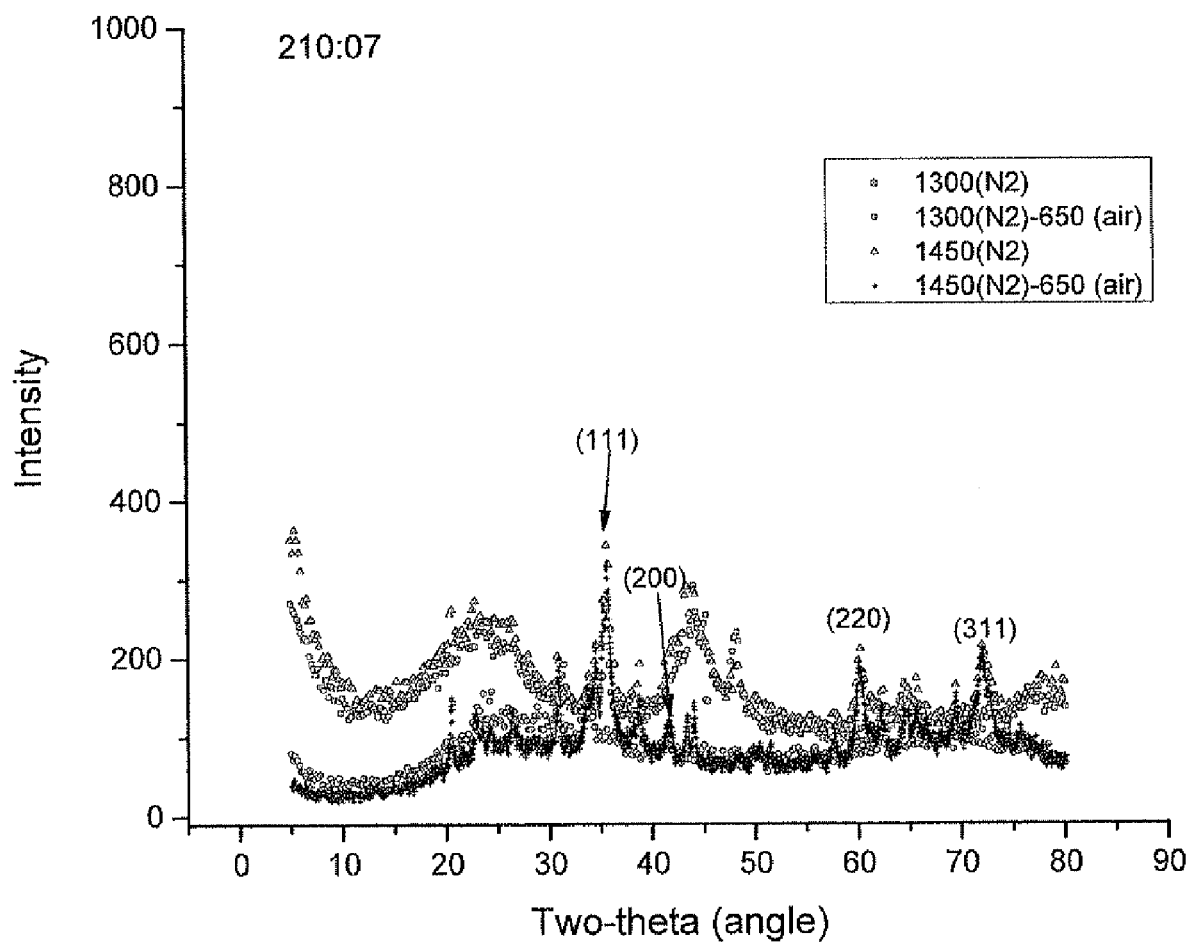

Several additional thermal treatment temperatures lower than 1600° C. were also tested to better elucidate the formation mechanism of the crystalline silicon carbide. FIG. 3 shows (a) low and (b) wide angle XRDs for the 210 formulation, which was treated by heating to 1300° C. or 1450° C. for 3 hr in $N_2$, and then optionally calcined at 650° C. in a $N_2/O_2$ mixture.

According to the low angle XRD reflections, OMSiC-1300 and 1450 show very high mesopore order at all temperatures. The wide angle XRD patterns indicate that crystalline SiC can be observed when the temperature is greater than 1300° C. The diffraction peaks of β-SiC become more intense when the temperature approaches ~1450° C., suggesting that β-SiC is a major constituent of mesoporous SiC. Four diffraction peaks at two-theta values of 35.6°, 41.4°, 59.9° and 72° are clearly observable, which can be indexed to the (111), (200), (220) and (311) planes of β-SiC. Based on the XRD data, raising the carbothermal temperature leads to a distinct improvement in the crystallinity of the SiC lattice with little effect on the mesopore order.

The carbonization/carbothermal reaction in $N_2$ was followed by an optional calcination step under controlled atmosphere in a $N_2/O_2$ (2%) mixture at 650° C. for 8 hr to remove residual carbon. An example of a calcination step comprises heating the post-carbonized, post-carbothermally reduced samples in an oxygen-containing environment to a temperature between about 600 and 700° C. After treatment with low levels of $O_2$, the samples change color from black to whitish-grey, and the wide angle XRDs show distinct β-SiC formation for the 1450° C. sample. With further reference to FIG. 3, some silicon nitride ($Si_3N_4$) is formed during the carbothermic reduction step at 1300 and 1450° C.

NMR

Figure 4:
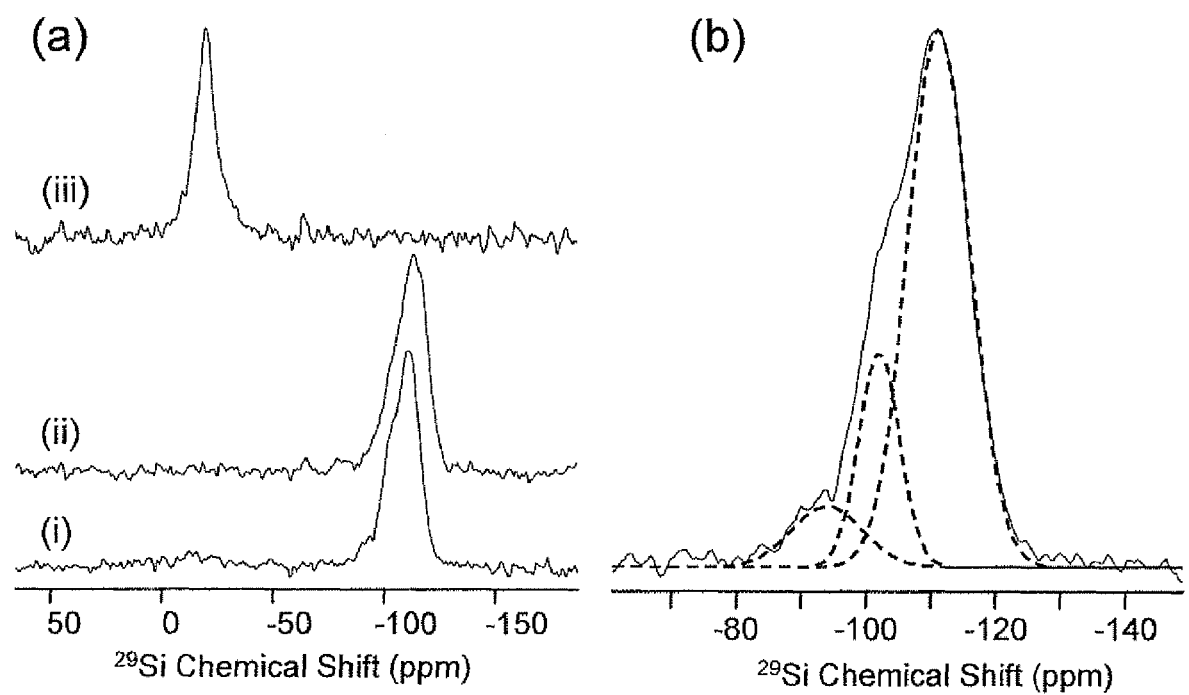
FIG. 4 is a plot of the $^{29}Si$ MAS NMR spectra of ordered mesoporous SiC samples after heating at 600° C., 900° C. or 1600° C.

The $^{29}$Si MAS NMR spectra of samples heat treated under flowing $N_2$ at (i) 600, (ii) 900 and (iii) 1600° C. are plotted in FIG. 4(a). An expanded spectrum of the 600° C. sample is shown in FIG. 4(b) with Gaussian fits shown as dashed lines. At this low treatment temperature, the only silicon species detected gives rise to a resonance centered near −105 ppm (see (i) and (ii) in FIG. 4a). This peak is attributed to silica environments. The 600° C. sample in FIG. 4(a) shows additional fine structure, which when expanded as in FIG. 4(b), can be fit to a sum of three Gaussian resonances. These three peaks, at chemical shifts of −111, −102 and −94 ppm, correspond to silica with zero, one and two silanols, respectively.

At higher treatment temperatures, a single new resonance appears having a chemical shift of −20 ppm ((iii) in FIG. 4a). This resonance is assigned to SiC and indicates that substantially all of the silicon present in this material has been converted from oxide to carbide.

Consistent with the above discussion with respect to the XRD data, silicon nitride ($Si_3N_4$) is also detected in samples heated at 1450° C. in nitrogen. For some of these materials, the $Si_3N_4$ content, as derived from a $^{29}$Si NMR resonance around −48 ppm, is pronounced and likely inhibits the formation of silicon carbide.

Physisorption

Nitrogen and argon ($N_2$ and Ar) physisorption measurements are shown in Table 2 for three formulations (formulations 209, 210 and 211), which were heated at 900 and 1600° C. The different OMC/$SiO_2$ ratios of these samples are shown in Table 1. According to the physisorption data, these materials have high specific surface areas of 400-500 m$^2$/g for OMSiC-900 and 600-900 m$^2$/g for OMSiC-1600.

In embodiments where carbonization/carbothermal reduction is done at 1600° C., the samples exhibit a 35-40% mass loss over the temperature range of 900° C. to 1600° C. By normalizing with respect to the mass loss, the measured surface areas are consistent with pore dimensions that are stable throughout the carbothermal reduction process. Referring to Table 2, these materials also have a narrow pore size distribution with an average adsorption pore diameter of 3.9-4.9 nm ($N_2$ adsorption) and 5.6-5.9 nm (Ar adsorption).

Over the C/$SiO_2$ molar ratio range of 5.7/1 to 10.5/1, the pore window sizes for samples heated at 900° C. are approximately equal when comparing the hysteresis loops of the sorption isotherms and pore size distribution data. The peak pore size slightly varies from 4.8 to 5.8 nm, which indicates a minor difference in the pore structures. However, the peak adsorption pore size increases with increasing carbothermal temperature (see $N_2$ data Table 2). Since the d-spacing from XRD does not show any dramatic change, it is believed that the pore walls decrease in thickness with increasing carbothermal temperature.

In Table 2, BJH refers to surface area (SA), pore volume (PV) and pore diameter (PD) data calculated according to the Barrett, Joyner and Halenda model. Surface area (SA) data (shown in units of m$^2$/g) is tabulated as both desorption cumulative surface area (DCSA) and adsorptive cumulative surface area (ACSA). In a similar vein, pore volume data (shown in units of cc/g) is tabulated as both desorption cumulative pore volume (DCPV) and adsorptive cumulative pore volume (ACPV). Also tabulated are the BJH adsorptive pore diameter (APD) (in Angstroms) and the BJH maximum pore diameter (MPD) (in Angstroms).

TABLE 2

Nitrogen and argon physisorption data

| gas | sample | micro pore BET [m$^2$/g] | total PV [cc/g] | micro PV [cc/g] | BJH DCSA [m$^2$/g] | BJH ACSA [m$^2$/g] | BJH DCPV [cc/g] | BJH ACPV [cc/g] | BJH APD [Å] | BJH MPD [Å] |
|---|---|---|---|---|---|---|---|---|---|---|
| $N_2$ | 209-900 | 438.0 | 0.37 | 0.08 | 364.5 | 319.4 | 0.45 | 0.31 | 39.2 | 48 |
| | 210-900 | 502.1 | 0.41 | 0.11 | 354.7 | 317.0 | 0.55 | 0.31 | 39.7 | 48 |
| | 211-900 | 565.0 | 0.61 | 0.10 | 545.6 | 455.8 | 0.79 | 0.55 | 48.5 | 58 |
| | 209-1600 | 797.4 | 0.84 | 0.03 | 876.3 | 798.9 | 0.98 | 0.82 | 40.9 | 55 |
| | 210-1600 | 604.0 | 0.62 | 0.05 | 651.0 | 653.8 | 0.78 | 0.66 | 40.2 | 56 |
| | 211-1600 | 897.8 | 0.93 | 0.07 | 950.9 | 862.7 | 1.09 | 0.95 | 44.1 | 60 |
| Ar | 209-900 | 446.3 | 0.50 | 0.06 | 410.5 | 329.0 | 0.54 | 0.46 | 56.3 | 51 |
| | 210-900 | 487.9 | 0.51 | 0.09 | 380.7 | 311.4 | 0.57 | 0.44 | 56.5 | 53 |
| | 211-900 | 549.7 | 0.68 | 0.08 | 566.3 | 442.1 | 0.77 | 0.65 | 59.0 | 62 |

SEM/TEM

Figure 5:
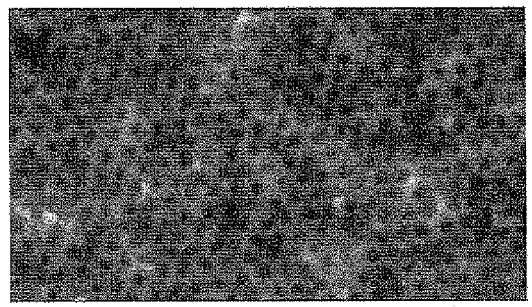
FIG. 5 shows SEM micrographs of ordered mesoporous SiC samples formed under different carbothermal conditions.
Figure 5:
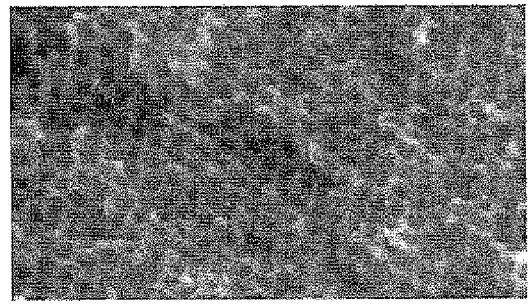
Figure 5:
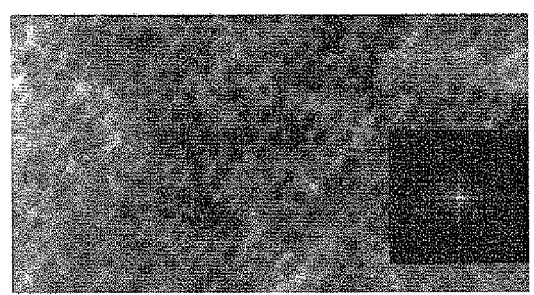
Figure 5:
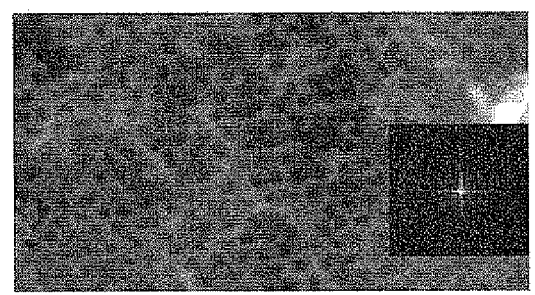
Figure 5:
Figure 5:
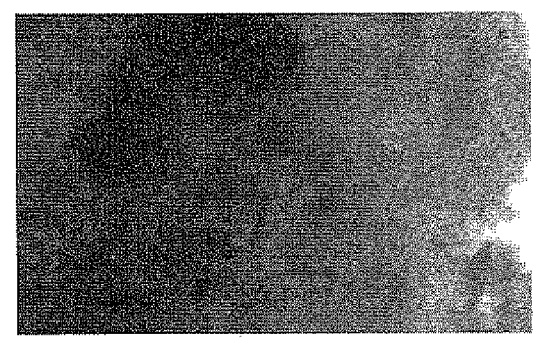

Scanning electron microscopy was used to evaluate samples 209, 210 and 211. Both 209 and 211 were powders, while 210 was a cleaved surface of compacted powder. SEM micrographs and their corresponding Fourier transformation are shown in FIGS. 5 (a) and (b) for two formulations (210, left series of images and 211, right series of images) that were treated at 900° C. (FIG. 5(a)) and 1600° C. (FIG. 5(b)).

SEM data reveal an ordered pore structure in the OMSiC-900 and 1600° C. treated samples, with Fourier transformed images confirming hexagonal pore symmetry. All of these samples have a hexagonal pore structure but, as observed from SEM and predicted by phase diagrams, the structural ordering was better defined in samples 210 and 211. The pore size was in the range of 4.5-5 nm.

Analysis of the cleaved cross-section from sample 210-900 revealed an additional phase. This phase was enriched in silicon compared to the remainder of the material. However, the pore orientation remained the same across phase boundaries.

Transmission electron microscopy (TEM) was used for samples 210 and 211 when carbothermal reduction was followed by a calcination step in air. Because these samples were non-conductive, traditional SEM imaging was not possible. FIG. 5(c) shows images taken under transmission conditions for the air-treated OMSiC samples (treatment at 1450° C. followed by treatment under $N_2/O_2$ (2%) at 650° C. for 8 hr).

As an alternative to silicon carbide, the disclosed method can readily be adapted to produce other metal carbides (e.g., TiC, TaC, WC or $W_2C$) by substituting an appropriate inorganic precursor for the silica precursor.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of forming an ordered mesoporous silicon carbide nanocomposite, comprising:
   forming a precursor mixture comprising a carbon precursor, a silica precursor, a surfactant, and an oil;
   drying the precursor mixture and cross-linking the carbon and silica precursors to form a surfactant-based self-assembled template and a carbon and silica precursor-based mesostructure phase that is ordered by the template; and
   thermally treating the precursors to form an ordered mesoporous silicon carbide nanocomposite.

2. The method according to claim 1, wherein the carbon precursor comprises a phenolic resin, the silica precursor comprises pre-hydrolyzed tetraethyl orthosilicate, and the surfactant comprises a tri-block co-polymer.

3. The method according to claim 1, wherein the precursor mixture has a carbon to silica mole ratio greater than 3.

4. The method according to claim 1, wherein the precursor mixture has a carbon to silica mole ratio between about 6 and 20.

5. The method according to claim 1, wherein the oil is selected from the group consisting of butanol, p-xylene, octane, hexadecane, hexanol, pentanol, butyl acetate, mesitylene and 1,3,5-trimethylbenzene.

6. The method according to claim 1, further comprising hydrolyzing the silica precursor prior to drying the precursor mixture.

7. The method according to claim 1, wherein the step of thermally treating comprises heating the dried and cross-linked precursors to a temperature in a range of about 900° C. to 1600° C.

8. The method according to claim 1, wherein the step of thermally treating comprises heating the dried and cross-linked precursors to a temperature in a range of about 1200° C. to 1600° C. to carbonize and carbothermally reduce the carbon precursor and the silica precursor.

9. The method according to claim 1, wherein the step of thermally treating comprises (1) heating from room temperature to about 400° C. at a rate of about 2° C./min, (2) holding at 400° C. for about 3 hr, (3) heating from 400° C. to a reaction temperature at about 1° C./min, (4) holding at the reaction temperature for 3-12 hr, and (5) cooling to room temperature.

10. The method according to claim 1, wherein the silicon carbide nanocomposite comprises β-SiC.

11. The method according to claim 1, wherein the silicon carbide nanocomposite has a total surface area ranging from about 400 to 900 $m^2/g$.

12. The method according to claim 1, further comprising removing residual carbon from the nanocomposite material by heating the nanocomposite material to a temperature between about 600° C. and 700° C. in an oxygen-containing environment.

13. An ordered mesoporous silicon carbide nanocomposite prepared according to the method of claim 1.

* * * * *